United States Patent
Rutar et al.

(10) Patent No.: US 11,674,454 B2
(45) Date of Patent: Jun. 13, 2023

(54) REGULATED FLOW DIVIDER VALVES WITH SECONDARY EQUALIZATION VALVES

(71) Applicant: Hamilton Sundstrand Corporation, Charlotte, NC (US)

(72) Inventors: Matej Rutar, Manchester, CT (US); Francis P. Marocchini, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/205,435

(22) Filed: Mar. 18, 2021

(65) Prior Publication Data

US 2021/0301735 A1 Sep. 30, 2021

Related U.S. Application Data

(60) Provisional application No. 63/002,070, filed on Mar. 30, 2020.

(51) Int. Cl.
*F02C 9/00* (2006.01)
*F02C 9/26* (2006.01)
*F02C 7/228* (2006.01)

(52) U.S. Cl.
CPC .............. *F02C 9/263* (2013.01); *F02C 7/228* (2013.01); *F05D 2220/32* (2013.01); *F05D 2270/051* (2013.01)

(58) Field of Classification Search
CPC ................................... F02C 7/228; F02C 9/34
See application file for complete search history.

(56) References Cited

U.S. PATENT DOCUMENTS

| | | |
|---|---|---|
| 5,339,636 A | 8/1994 | Donnelly et al. |
| 6,334,296 B2 | 1/2002 | Futa, Jr. et al. |
| 8,316,630 B2 | 11/2012 | Futa et al. |
| 9,234,465 B2 | 1/2016 | Futa et al. |
| 10,502,138 B2 | 12/2019 | Reuter et al. |
| 2007/0245744 A1 | 10/2007 | Dooley |
| 2010/0050593 A1 | 3/2010 | Futa et al. |
| 2018/0372321 A1 | 12/2018 | Yates et al. |

FOREIGN PATENT DOCUMENTS

EP 2535644 A2 12/2012

OTHER PUBLICATIONS

Extended European Search Report dated Aug. 6, 2021, issued during the prosecution of European Patent Application No. EP 21161473.0.

*Primary Examiner* — Katheryn A Malatek

(74) *Attorney, Agent, or Firm* — Locke Lord LLP; Joshua L. Jones; Scott D. Wofsy

(57) ABSTRACT

A system includes a flow inlet conduit. A primary conduit branches from the flow inlet conduit for delivering flow to a set of primary nozzles. An equalization bypass valve (EBV) connects between the flow inlet conduit and a secondary conduit for delivering flow to a set of secondary nozzles. The EBV is connected to be controlled to apportion flow from the flow inlet conduit to the secondary conduit. A secondary equalization valve (SEV) connects between the flow inlet conduit and the secondary conduit. The SEV is connected to be controlled by drain pressure (PD) to apportion flow from the flow inlet conduit to the secondary conduit.

5 Claims, 1 Drawing Sheet

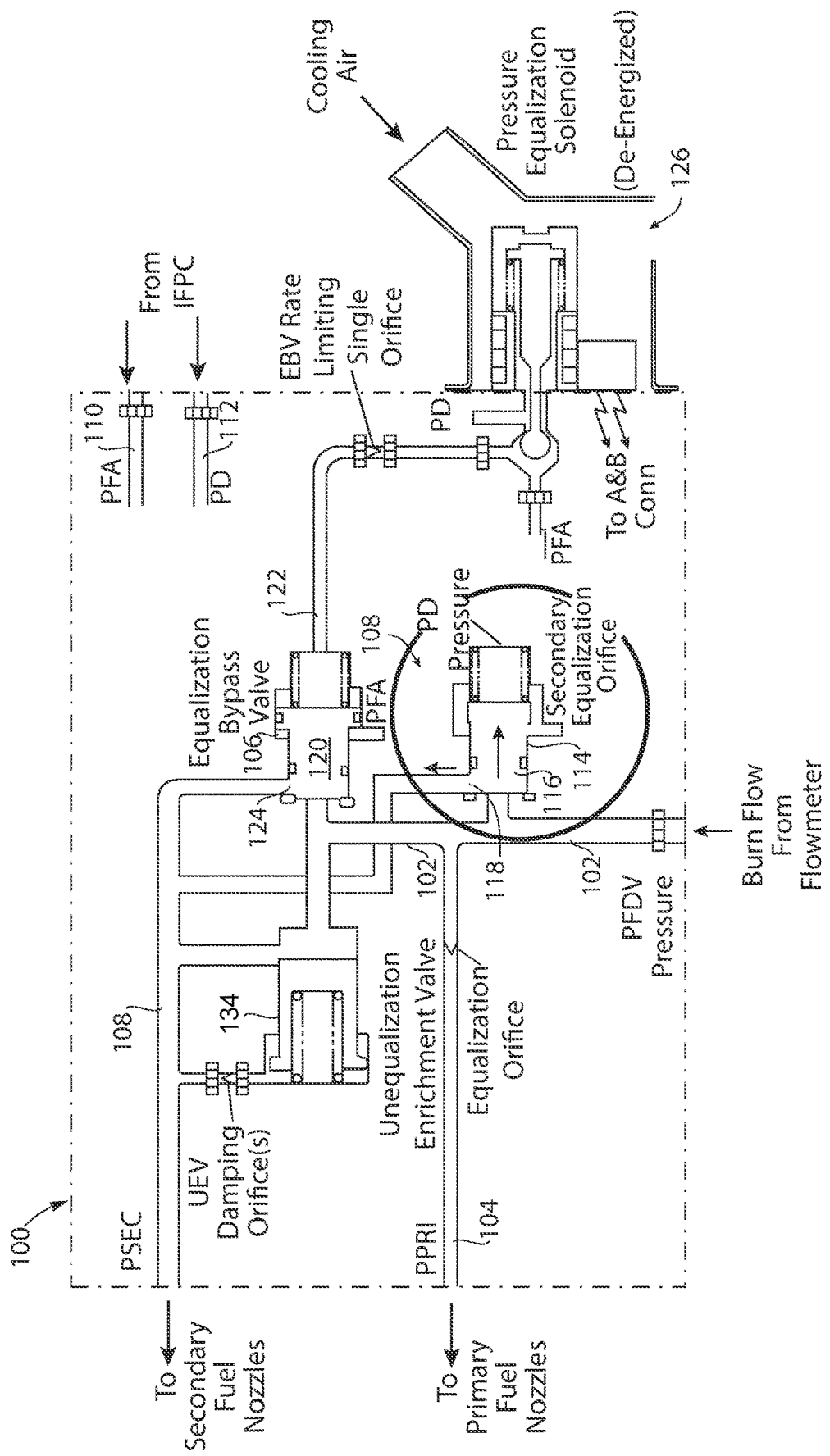

REGULATED FLOW DIVIDER VALVES WITH SECONDARY EQUALIZATION VALVES

CROSS-REFERENCE TO RELATED APPLICATIONS

This application claims benefit of priority to U.S. Provisional Patent Application No. 63/002,070 filed Mar. 30, 2020 the contents of which are incorporated by reference herein in their entirety.

BACKGROUND

1. Field

The present disclosure relates to flow regulating systems, and more particularly to flow divider valves such as for use in aerospace fuel systems.

2. Description of Related Art

Gas turbine burners can have at least two sets of fuel injection nozzles, e.g., primary nozzles and secondary nozzles. Valves are used to control the flow split between the primary and secondary nozzles. There are transitions from one flow split to another that need to be rate controlled to prevent disturbances, especially at low flow conditions. The better the time response when switching from one flow split to another without disturbances, the better the system can perform.

The conventional techniques have been considered satisfactory for their intended purpose. However, there is an ever present need for improved systems and methods for regulated flow divider valves. This disclosure provides a solution for this need.

SUMMARY

A system includes a flow inlet conduit. A primary conduit branches from the flow inlet conduit for delivering flow to a set of primary nozzles. An equalization bypass valve (EBV) connects between the flow inlet conduit and a secondary conduit for delivering flow to a set of secondary nozzles. The EBV is connected to be controlled to apportion flow from the flow inlet conduit to the secondary conduit. A secondary equalization valve (SEV) connects between the flow inlet conduit and the secondary conduit. The SEV is connected to be controlled by drain pressure (PD) to apportion flow from the flow inlet conduit to the secondary conduit.

The SEV can include a piston that divides between inlet pressure from fuel flow meter (PFDV) and PD to apportion flow from the flow inlet conduit to the secondary conduit based on pressure differential between PFDV and PD. The EBV can include a piston that divides between an equalization conduit and the flow inlet conduit to apportion flow from the flow inlet conduit to the secondary conduit based on pressure in the equalization conduit. The equalization conduit can be connected to a pressure equalization solenoid (PES) configured to equalize pressure between PFA and PD.

An un-equalized enrichment valve (UEV) can connect between the flow inlet conduit and the secondary conduit. The UEV can be configured to pressurize the primary conduit higher than the secondary conduit in the un-equalized mode. The SEV can be configured to passively open as pressure rises in the equalized or unequalized mode.

A method includes opening an alternate flow path to a flow path through the EBV in a system as described above, wherein the alternate flow path passes through the SEV. Opening the alternate flow path can include providing an equalization back up in case of failure of a pressure equalization solenoid (PES) configured to equalize pressure between PFA and PD, and/or providing an equalization back-up in case of failure of the EBV.

At a low acceleration pressure rise in the flow inlet conduit, the alternate flow path need not open. At a high acceleration pressure rise (wherein high acceleration is relative to the low acceleration pressure rise), the alternate flow path can open. The method can include preventing system over pressurization during the high-pressure acceleration pressure rise when the EBV is too slow. The SEV can open after the system switches from an un-equalized mode to an equalized mode, wherein in the equalized mode the primary and secondary conduits are at equal pressure, and in the un-equalized mode the primary and secondary conduits are at unequal pressure.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to the FIGURE, wherein:

FIG. 1 is a schematic view of an embodiment of a system constructed in accordance with the present disclosure, showing the inlet flow conduit, primary conduit, secondary conduit, and the valves.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used to provide an alternate path for equalization between primary and secondary conduits, e.g. supplying fuel respectively to primary and secondary nozzles in an aerospace combustion system. This can provide back up in case of failure of the switching solenoid or the main equalization valve. Total pressure drop at equalization can be reduced due to the additional valve relative to traditional systems. During fast accelerations in flow, the secondary equalization valve (SEV) opens to prevent system over pressurization, as the main equalization valve may be rate limited to be too slow to handle the fast acceleration without disturbances e.g. at downstream nozzles, especially at low flow conditions.

The system 100 includes a flow inlet conduit 102. A primary conduit 104 branches from the flow inlet conduit 102 for delivering flow to a set of primary nozzles. An equalization bypass valve (EBV) 106 connects between the flow inlet conduit 102 and a secondary conduit 108 for delivering flow to a set of secondary nozzles. The EBV 106 is connected to be controlled by IFPC servo pump supply pressure fine filtered (PFA) pressure (indicated at inlet 110 from integrated fuel pump controls (IFPC) in FIG. 1) to apportion flow from the flow inlet conduit 102 to the secondary conduit 108. A secondary equalization valve (SEV) 114 connects between the flow inlet conduit 102 and the secondary conduit 108. The SEV is connected to be controlled by drain pressure (PD, indicated at inlet 112 from IFPC in FIG. 1, also referred to as IFPC gear pump inlet pressure) to apportion flow from the flow inlet conduit 102 to the secondary conduit 108.

The SEV 114 includes a piston 116 that divides between inlet pressure from fuel flow meter (PFDV) in the flow inlet conduit 102 and PD from inlet 112 to apportion flow from the flow inlet conduit 102 to the secondary conduit 108 based on pressure differential between PFDV and PD. As the difference between PFDV and PD increases, the piston 116 moves more to the right oriented in FIG. 1, to reduce the occlusion of the SEV outlet 118 by the piston 116.

The EBV 106 is a two position valve. When closed (with the EBV piston 120 on the left as oriented in FIG. 1), all PFDV flow from the inlet conduit 102 to secondary conduit 108 (at secondary pressure Psec) has to flow through the unequalized enrichment valve (UEV) 134, which regulates PFDV to a higher pressure then Psec (e.g., a 100 psid difference). When EBV 106 is open (with the piston 120 of the EBV 120 on the right as oriented in FIG. 1), the EBV 106 opens a large flow path between PFDV of the inlet conduit 102 and Psec of the secondary conduit 108. The pressure difference from Psec to PFDV is reduced (equalized) to 0 psid, or nearly 0 psid. The UEV 134 ends up closing when the EBV 106 is open because UEV 134 cannot set its regulation pressure because the flow area through the EBV 106 is big enough.

In positioning the EBV 106, PFA and PFDV pressure always act to open the valve (push the piston 120 to the right as oriented in FIG. 1 to unocclude the outlet 124 of the EBV 106). Then the pressure on the backside of the EBV 106 (the pressure in the equalization conduit 122) is switched between PFA and PD based on the positioning of the Pressure Equalization Solenoid (PES) 126. When the pressure in the conduit 122 is at PFA, the piston 120 of the EBV 106 moves to the left as oriented in FIG. 1 (to the closed position). When the pressure in the conduit 122 is at PD, the piston 120 of the EBV 106 moves to the right as oriented in FIG. 1 (to the open position). This valve actuation is a result of the inequality: PFA>PFDV>PD.

The UEV 134 can connect between the flow inlet conduit 102 and the secondary conduit 108. The UEV 134 can be configured to pressurize the primary conduit 104 higher than the secondary conduit 108 in the un-equalized mode, e.g. for starting and burner tonal control. The SEV 114 is configured to passively open as pressure rises in the flow inlet conduit 102 in the equalized mode. The SEV 114 can also open unequalized, but its opening is triggered between PFDV and PD, with PD pressure staying relatively low.

A method includes opening an alternate flow path to a flow path through the EBV 106 in a system 100 as described above, wherein the alternate flow path passes through the SEV 114. Opening the alternate flow path can include providing an equalization back up in case of failure of a PES 126 configured to switch pressure on the right side (as oriented in FIG. 1) of the piston 120 the EBV 122 between PFA and PD, which causes the EBV to open or close. It is also contemplated that this can provide an equalization back up in case of failure of the EBV 106.

At a low acceleration pressure rise in the flow inlet conduit 102, the alternate flow path need not open. At a high acceleration pressure rise (wherein high acceleration is relative to the low acceleration pressure rise), the alternate flow path can open. The method can include preventing system over pressurization during the high-pressure acceleration pressure rise when the EBV 106 is too slow. The SEV 114 can open after the system switches from the un-equalized mode to the equalized mode.

The methods and systems of the present disclosure, as described above and shown in the drawings, can provide an alternate path for equalization between primary and secondary conduits, e.g. supplying fuel respectively to primary and secondary nozzles in an aerospace combustion system. This can provide back up in case of failure of the switching solenoid or the main equalization valve. Total pressure drop at equalization can be reduced due to the additional valve relative to traditional systems. During fast accelerations in flow, the secondary equalization valve (SEV) opens to prevent system over pressurization, as the main equalization valve may be rate limited to be too slow. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising: in a system including:
    a flow inlet conduit;
        a primary conduit branching from the flow inlet conduit for delivering flow to a set of primary nozzles;
        an equalization bypass valve (EBV) that connects between the flow inlet conduit and a secondary conduit for delivering the flow to a set of secondary nozzles, wherein the EBV is connected to be controlled to apportion the flow from the flow inlet conduit to the secondary conduit; and
        a secondary equalization valve (SEV) that connects between the flow inlet conduit and the secondary conduit, wherein the SEV is connected to be controlled by drain pressure (PD) to apportion the flow from the flow inlet conduit to the secondary conduit,
    opening an alternate flow path that is an alternate to a flow path through the EBV, wherein the alternate flow path passes through the SEV and not through the EBV, wherein below a low acceleration pressure rise in the flow inlet conduit, the alternate flow path does not open, wherein at a high acceleration pressure rise, relative to the low acceleration pressure rise, the alternate flow path opens.

2. The method as recited in claim 1, wherein opening the alternate flow path includes providing an equalization back up in case of failure of a pressure equalization solenoid (PES) configured to equalize pressure between integrated fuel pump controls (IFPC) servo pump supply pressure fine filtered (PFA) pressure and the drain pressure (PD).

3. The method as recited in claim 1, wherein opening the alternate flow path includes providing an equalization back up in case of failure of the EBV.

4. The method as recited in claim 1, further comprising preventing system over pressurization during the high acceleration pressure rise.

5. The method as recited in claim 1, wherein the SEV opens after the system switches from an un-equalized mode to an equalized mode, wherein in the equalized mode the primary and secondary conduits are at equal pressure, and in the un-equalized mode the primary and secondary conduits are at unequal pressure.

\* \* \* \* \*